United States Patent [19]

Romenets et al.

[11] Patent Number: 4,913,734
[45] Date of Patent: Apr. 3, 1990

[54] METHOD FOR PREPARING FERROCARBON INTERMEDIATE PRODUCT FOR USE IN STEEL MANUFACTURE AND FURNACE FOR REALIZATION THEREOF

[75] Inventors: Vladimir A. Romenets; Alexandr B. Usachev, both of Moscow; Alexei A. Ugarov, Belgorodskaya; Valentin P. Bystrov, Moscow; Valery S. Valavin, Moscow; Vasily R. Grebennikov, Moscow; Anatoly B. Glovatsky, Moscow; Gennady L. Gursky, Moscow; Dmitry I. Ryzhonkov, Moscow; Alexandr D. Vaskevich, Moscow; Valentina M. Chizhikova, Moscow; Alexandr D. Yatsenko-Zhuk, Moscow; Vladimir G. Guglya, Moscow; Alexandr M. Pozhivanov, Lipetsk; Evgeny F. Vegman, Moscow; Nikolai A. Tulin, Moscow; Stanislav V. Kremenevsky, Moscow, all of U.S.S.R.; Andrei V. Vanjukov, deceased, late of Moscow, U.S.S.R., by Ruf A. Berkman, Anna A. Pedos, Natalya A. Vanjukova, Administrators

[73] Assignee: Moskovsky Institut Stali I splavov, Moscow, U.S.S.R.

[21] Appl. No.: 279,670
[22] PCT Filed: Feb. 16, 1987
[86] PCT No.: PCT/SU87/00023
§ 371 Date: Oct. 5, 1988
§ 102(e) Date: Oct. 5, 1988
[87] PCT Pub. No.: WO88/06190
PCT Pub. Date: Aug. 25, 1988

[51] Int. Cl.[4] .......................... C21B 11/08; F27B 3/02
[52] U.S. Cl. .................................. 75/501; 266/176; 266/201
[58] Field of Search .................... 75/24, 38, 40, 30; 266/176, 201

[56] References Cited

U.S. PATENT DOCUMENTS

| | | | |
|---|---|---|---|
| 2,562,813 | 7/1951 | Ogorzaly et al. | 75/40 |
| 2,612,444 | 9/1952 | Rummel | 75/40 |
| 4,294,433 | 10/1981 | Vanjukov et al. | 266/201 |
| 4,434,003 | 2/1984 | Geskin | 75/24 |

Primary Examiner—Melvyn J. Andrews
Attorney, Agent, or Firm—Burgess, Ryan and Wayne

[57] ABSTRACT

The hereinproposed method and furnace provide for preliminary building up of melt in a melting pot (10) of a rectangular shape in the horizontal section, delivery of an oxygen-containing gas (3) into the melt below its surface level through tuyeres (13) with nozzles (14) installed in the longer walls of the melting pot (10) creating two melt zones: an upper zone (9) loaded with solid carbon fuel (2) in an amount sufficient for providing a volumetric concentration of said fuel within 0.5 to 50% of the melt volume in said zone (9), wherein said concentration is maintained by subsequent concurrent loading of iron-bearing material (1) and solid carbon fuel (2), and a lower zone (8) consisting of a layer of slag (4) and a layer of ferrocarbon intermediate product (5) said layers being discharged separately through channels (17 and 18) made in the counterproposed short walls of the melting pot (10). The ratio of the horizontal section area of the melting pot (10) at the installation level therein of tuyeres (13) to the total area of the outlet holes of the nozzles (14) is 300–10000, while the distance (h) from the lower boundary of the product discharge channel (18) to the upper boundary of the slag discharge channel (17) is 0.3 to 0.75 the distance (H) from the lower boundary of the product discharge channel (18) to the installation level of the tuyeres (13).

21 Claims, 4 Drawing Sheets

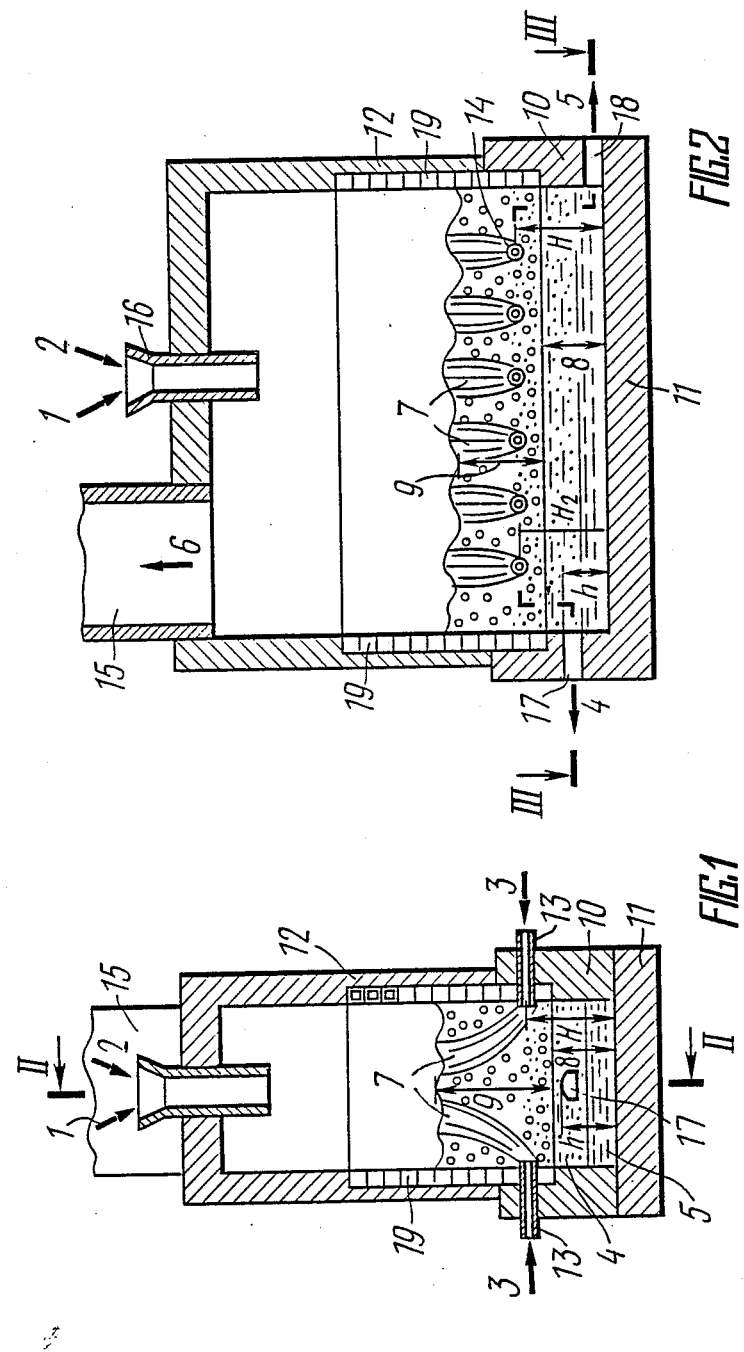

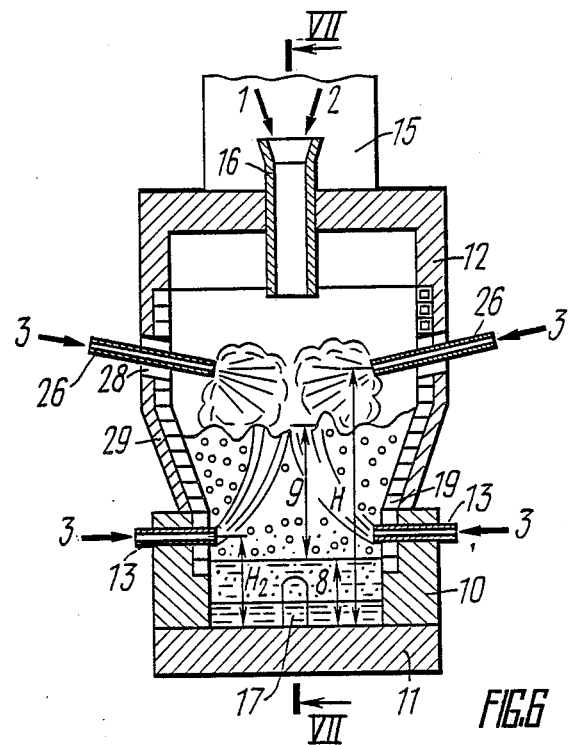
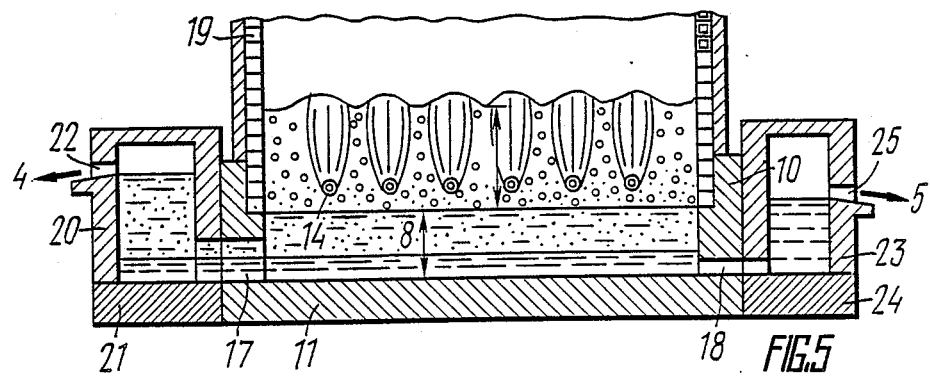

METHOD FOR PREPARING FERROCARBON INTERMEDIATE PRODUCT FOR USE IN STEEL MANUFACTURE AND FURNACE FOR REALIZATION THEREOF

FIELD OF THE ART

The invention relates to ferrous metallurgy and, more particularly, to a method for preparing a ferrocarbon intermediate product for use in steel manufacture, and to a furnace for realization thereof.

Most successfully the present invention can be utilized in processing partly reduced or raw iron-ore materials for the preparation of an intermediate product used in steel manufacture.

The present invention can also be used to advantage for utilization of iron-bearing rejects of metallurgical industry such as dried sludges, dusts liberated in gas purification, scale, as well as small-lump ferrous metal scrap, particularly chips.

PRIOR ART

Nowadays the basic method for preparing a ferrocarbon intermediate product for use steel making is blast-furnace melting which yields cast iron from iron ore materials including those reduced in advance and makes it possible to rework partly iron-bearing rejects including sludge, scrap and chips. However, the blast-furnance melting calls for preliminary preparation of iron-ore raw materials by modulizing i.e. by sintering or making pellets; besides, the reducing fuel used in blast-furnace melting is a high-quality metallurgical coke which can be made from a limited number of expensive coking coals whose world deposits are dwindling down at a fast rate. Thus, the blast-furnace melting, apart from the blast-furnace practice proper, calls for having a by-product coke industry and a production of sinter or pellets.

Besides, effective blast-furnace melting requires raw materials with a high iron content, i.e. as a rule, previously enriched raw materials. Lean and hard-to-enrich ores are practically uneconomical.

Another prerequisite for efficient blast-furnace melting is a sufficiently large production volume. In small-scale production the blast-furnace melting proves inefficient.

A further disadvantage of blast-furnace melting lies in that the chemical composition of its product, i.e. cast iron can be changed within very narrow limits. This complicates the steel making technology.

In addition, blast-furnace melting allows but a small amount of rejects to be utilized in the charge. The use of rejects affects adversely the performance of the furnaces and the process indices. For example, the use of metallurgical sludges introduced into the charge for producing sinter, cuts down the output of the blast furnaces and steps up the consumption of coke because of the formation of zinc skull in the furnaces.

The above-stated disadvantages of the blast furnace process, of which the use of coke in the main one, gave an impetus to the creation of a new branch of metallurgy, so-called coke-free metallurgy. Up to the present time there appeared a number of new technological processes and production layouts which can be classified into the following main trends.

The first trend includes processes for the preparation of ferrocarbon intermediate product, these processes being dependent on the use of electric power and being carried out in electric furnaces. When the charge in these processes is contituted by iron ores or their concentrates, these processes are, as a rule, multistage. Electric melting is preceeded by heating and preliminary solid-phase reduction of the raw material. In most effective processes Elred and Inred belonging to this trend and developed of late in Sweden, the use of electric power is partly supplemented by the energy of coal burnt in oxygen. However, even in these processes the consumption of electric power remains high. Besides, they still utilize a certain amount of coke. The processes dependent on the use of electric energy can prove effective only on condition that the production of said electric power utilizes the process flue gases. However, even in this case high losses sustained in transmission of energy and multiple transformations will render said processes less effective than those in which the energy of fuel is utilized directly.

Another trend widely pursued of late includes methods of preparation of a ferrocarbon intermediate product through the use of noncoking coal and gaseous oxygen for melting partly reduced raw material in converter-type units. To this trend belong the processes COIN, KS, the process of the Japanese firm Sumitomo, etc. They are based on injection of pulverized coal in a stream of oxygen into the metal bath. A portion of coal burns up in oxygen, forming CO and releasing heat required for melting. The other portion of coal is used for carburization of metal. When the charged raw material melts, the iron oxides move into slag where they are reduced by carbon dissolved in metal.

The reducing gas evolved in these processes is utilized for preliminary reduction of iron-ore raw materials. Thus, the mechanism of preparing the intermediate product from iron-ore raw material for steel manufacture is divided into two stages. Another disadvantage of this group of processes is the use of pulverized coal whose preparation involves heavy difficulties. Besides, pneumatic transportation of pulverized coal in the stream of oxygen is highly complicated. A serious problem is the strength of the refractory lining of the furnace. The use of cooled elements in the furnace instead of refractories when the metal bath is boiling due to the interaction of carbon dissolved in it with the oxides of slag iron is virtually impossible.

A specific trend is represented by the processes, wherein the reducing gas liberated from the melt (mostly CO) is utilized directly in a melting-reduction furnace rather than in another unit (e.g. for preliminary reduction of the raw material for burning to heat the raw material, to produce steel electric power. This trend also embraces such processes as Dored, Eketorp-Vallak, etc. These have been actively pursued and developed in the 50s and 60s. Their merits include simple technology and equipment, single-stage nature attained by reburning the process gases directly in the furnace. However, the heat of reburning is utilized not sufficiently well. Therefore, these processes have not enjoyed wide recognition. More than that, owing to a successful development of solid-phase reduction of iron-ore raw materials, recent years have witnessed mostly the processes involving no reburning, since the gas produced in these processes can be used as a reducing agent in solid-phase reduction of iron-ore raw materials.

However, if the processes without reburning are to be sufficiently effective, it is expedient that their charge should consist of pre-reduced iron-ore raw materials produced by solid-phase reduction.

Most closely approaching the present invention with respect to the technical essence and the effect sought for is a method for preparation of ferrocarbon intermediate product for use in steel manufacture, comprising simultaneous loading of an iron-bearing material and solid carbon fuel and delivery of an oxygen-containing gas, their interaction, in which the oxygen of the oxygen-containing gas oxidizes part of the fuel, releasing the heat expended for melting the iron-bearing material and reducing the metal oxides it contains with the carbon of the remaining fuel accompanied by the formation of liquid products of melting, viz., slag and ferrocarbon intermediate product and process gases and, lastly, discharging the liquid products of melting and process gases. This method is realized with the aid of a furnace comprising a melting pot with a hearth, a stack resting on a melting reservoir and provided with at least one device for charging the iron-bearing material and solid carbon fuel into the melting pot located in the top part of the stack, a tuyere with nozzles for the delivery of oxygen-containing gas into the melting pot which has a slag-discharge duct made in the wall of the melting pot, at its hearth, and a duct for discharging the ferrocarbon intermediate product made in the wall of the melting pot below the installation level of the tuyeres with nozzles, and a means for discharging the process gases from the stack, located in the upper part thereof. (Inventor's Certificate of the USSR No. 1169995, C1C12B 13/00 published in the Bulletin "Discoveries, Inventions, Industrial Designs and Trademarks" No. 28, 1985).

The known method is realized as follows. At the beginning of melting the melting pot of the furnace is charged with coke acting as a packing, then oxygen-containing gas is fed through tuyeres and an iron-bearing material is loaded on top of coke through an appropriate device. After burning up the coke (coke packing), melting the iron-bearing material and reducing the oxides of its metals the resultant melt consists of a metal and slag. Then an oxygen-containing gas is delivered above the surface of the melt and the place of coke is taken by a solid carbon fuel (coal) which starts to be loaded from above together with the iron-bearing material (sponge iron). A part of fuel (coal) is oxidized in the oxygen-containing gas to CO, while the liberated gases ascend, creating a fluidized bed of coal particles above the melt. The released heat creates a sufficiently high temperature is said bed. The heat of the high-temperature zone is transmitted by radiation to the melt receiving the iron-bearing material that continues falling from above. In the course of its fall through the furnace stack said material is partly heated, then, floating on the slag surface or inside it melts, forming a liquid metal, i.e. a ferrocarbon intermediate product for steel manufacture, which goes down and accumulates on the hearth under the layer of slag. The liquid products of melting, i.e. metal and slag, are discharged either continuously or intermittently. This method also provides for the use of crushed iron-ore raw materials without pre-reduction, and of the fine ore of non-iron materials. The upper part of the fluidized bed of coal above the delivery level of the oxygen-containing gas may be supplied with liquid or gaseous hydrocarbons.

The known method and the furnace for realization thereof are insufficiently economical, which is attributable to a number of factors.

Since the main heat-mass transfer processes take place in the fluidized bed of coal, this calls for high rates of oxygen feed and high discharge velocities of process gases formed. This results in high losses of coal and the handled iron-bearing material which are carried out in the form of dust. The size of particles of the iron-bearing material and fuel shall be kept within narrow limits selected in response to the velocity of discharged gases. Otherwise, the small fractions will be carried over from the furnace while the larger ones will get into the layer of slag unmelted and insufficiently heated.

Inasmuch as the slag is in quescent state, its heat-absorbing surface is limited by the bath surface area and the heat exchange in the layer of slag is difficult because of its low heat conduction. Therefore, the particles of the material falling into slag are slowly heated and melted and the slag surface becomes covered with a layer of sufficiently large lumps of fuel that cannot be held in the fluidized bed. Featuring but a low heat conduction, these lumps hinder heat transfer from the high-temperature zone to slag, because said heat transfer occurs predominantly by way of radiation.

If the iron-bearing material is constituted by iron-ore raw material (ore, concentrate or sponge iron) characterized by an insufficiently high degree of reduction, iron oxides of these materials will enter the slag. Reduction of iron from slag can be achieved due to the effect of the carbon of the fuel lumps floating on the slag surface or due to the contact of the slag with the reducing atmosphere of the furnace. However, both processes have low speeds because the phase contact surface is limited by the surface area of the slag bath and the speed of mass transfer in slag is low due to poor stirring.

All the above factors result in a low efficiency of the processes and, as a consequence, in overexpenditure of fuel and insufficient yield of metal, i.e. iron which is lost with the slag, particularly when the latter is discharged continuously. Besides, the known method and the furnace for its realization impose substantial limitations both on the chemical and granulometric composition of the iron-bearing material and fuel.

DISCLOSURE OF THE INVENTION

The cardinal object of the present invention resides in providing a method for preparing ferrocarbon intermediate product for use in steel manufacture comprising a number of technological processes which would create a large interface area between the phases: oxygen-containing gas—solid carbon fuel—melt and intensify the heat-mass transfer processes of interaction between the iron-bearing material, solid carbon fuel and oxygen-containing gas, and a furnace for the realization of said method, wherein the stack and melting pot would be so designed and the tuyeres feeding the oxygen-containing gas into said pot would be so arranged relative to said pot as to ensure a high efficiency of the method at a low consumption of solid fuel and high extraction of metal from the iron-bearing material This object is achieved by providing a method for preparation of ferrocarbon intermediate product for use in steel manufacture, comprising simultaneous loading of the iron-bearing material and solid carbon fuel, delivery of oxygen-containing gas, interaction of the iron-bearing material, solid carbon fuel and oxygen-containing gas in which the oxygen of the oxygen-containing gas oxidizes part of the fuel and releases the heat used for melting the iron-bearing material and reducing the metal oxides contained therein by the carbon of the remaining part of fuel, forming liquid products of melt, i.e. slag and ferrocarbon intermediate product and process gases and discharging the liquid products of melt and process gases in which, according to the invention, simultaneous loading of the iron-bearing material and solid carbon fuel is preceded by building up slag melt and the oxygen-containing gas is delivered into slag melt below its surface so that the stream of gas bubbles the melt and divides it into two zones, viz. the lower quiescent zone and the upper zone bubbled by the delivered gas and loaded with solid carbon fuel in a quantity sufficient for creating in this zone a volumetric concentration of fuel within 0.5 to 50% of the melt volume in this zone, the iron-bearing material and solid carbon fuel being simultaneously loaded into the upper zone with a view to maintaining the produced concentration of fuel, which, during interaction of the iron-bearing material with the solid carbon fuel and oxygen-containing gas, ensures the formation of liquid slag entering the lower zone and forming a slag layer therein and of liquid metal in the form of drops passing through the slag layer and creating under said layer a layer of ferrocarbon intermediate product, the liquid products of melting, i.e. slag and ferrocarbon intermediate product being discharged separately from the corresponding layers of the lower zone.

The preliminary building up of the slag melt and making a volumetric concentration of solid carbon fuel in its upper bubbled zone ranging from 0.5 to 50% allows the melting process to be started quickly without the use of the initial coke packing. Creation of the bubbled upper zone of the melt by delivering oxygen-containing gas, then delivering the solid carbon fuel and iron-bearing material into said zone provide for a large interface area between the phases: solid fuel—gas—melt and for an accelerated heat-mass transfer processes. As a result of oxidation of some solid carbon fuel in the melt, the produced gas has a high partial pressure of carbon monooxide (CO) which takes part in the reduction of metal, iron for one, from slag. The concentration in the bubbled zone of solid carbon fuel is maintained during melting (depending on the kind of fuel, properties of slag and other parameters) within the limits from 0.5 to 50% so as to provide conditions in the slag for efficient reactions of reduction. At fuel concentrations below 0.5% the reduction reactions cannot take place due to a high partial pressure of oxygen in the gaseous phase and an insufficient surface of interaction between the iron-bearing material, solid carbon fuel and oxygen-containing gas. At fuel concentrations higher than 50% the melt in the bubbled zone loses its fluidity, as a result of which the heat-and mass transfer in the bubbled zone is impaired. The formation in the lower zone of the pot of a quiescent zone consisting of a layer of slag and a layer of metal permits, on the one hand, improving the quality of separation of metal from slag and, on the other hand raising the stability of the refractory lining in this zone. All this taken together permits raising the efficiency of the process, thus reducing the specific consumption of solid carbon fuel and increasing the extraction of iron from the iron-bearing material.

In the course of melting it is expedient that the oxygen-containing gas should be delivered into the slag melt at the rate of 150 to 1500 $Nm^3/h$ per $m^2$ of the horizontal section area of the melt at the level where the oxygen-containing gas is delivered into said melt.

At a consumption below 150 $Nm^3/h$ per $m^2$ of the horizontal section area of the melt at the level where the oxygen-containing gas is delivered into said melt, the conditions of melt stirring are impaired and the heat-mass transfer processes are retarded, thus bringing about a lower efficiency and reduced extraction of iron. The consumption rates over 1500 $Nm^3/h$ per $m^2$ of the horizontal section area of the melt at the level where the oxygen-containing gas is delivered into said melt may bring about throwout of the melt and reduction of iron extraction due to a large volume of the oxidizing tuyere zones.

In the course of melting it is expedient that the flow rate of the oxygen-containing gas fed into the slag melt be increased in response to the increase in the reactivity of solid carbon fuel. All other conditions being equal, this may conduce to a higher output. Conversely, when passing over from the fuel with a high reactivity to the fuel with a low reactivity, it is good practice to reduce the amount of the delivered oxygen-containing gas. Otherwise the partial pressure of oxygen in the gaseous phase will rise, thereby increasing the losses of iron with slag.

The solution of this problem is promoted also by the fact that the oxygen-containing gas may be delivered into the slag melt continuously, with periodic interruptions in the concurrent loading of the iron-bearing material and solid carbon fuel.

This permits a reduction in the sulphur content in the resulting ferrocarbon intermediate product due to periodic refining from sulphur of the slag melt bath used in the process.

It is also expedient that the slag melt should be built up by pouring in liquid slag produced in the manufacture of ferrous metals, e.g. when making cast iron in blast furnaces, steel in converters, open-hearth furnaces and electric furnaces.

The liquid synthetic slag melted in advance in an electric or some other furnace can also be poured in.

To speed up the beginning of continuous melting, (in continuous production of metal) and to reduce wear of the refractory lining, it is good practice to pour liquid metal into the furnace before pouring in liquid slag.

If pouring in of liquid slag into the furnace is impossible for some reason or other, the slag melt can be built up by loading in and melting at least one of the solid oxide materials selected from the group consisting of slags produced in ferrous metallurgy, mineral raw materials and metal oxides.

In addition to the solid carbon fuel it is possible to deliver gaseous, liquid or solid pulverized carbon-containing fuel into the upper zone of the melt, below its surface level.

This delivery will improve the working conditions of tuyeres, speed up the interaction of carbon with the oxygen of the oxygen-containing gas thus contributing to reducing the volume of the zones with an oxidizing atmosphere inside the melt at the point of injection of the oxygen-containing gas.

To step up the stability of the process, it is expedient that the slag be withdrawn from the lower zone at the level of the middle or upper parts of the slag layer.

This will make it possible to produce a very slightly stirred layer of slag above the surface of the metal bath in the furnace. Short-term variations of the iron oxide content in the slag of the upper bubbled zone resulting from variations in the composition of the charge will bring about changes in the composition of slag in the upper and middle flowing parts of its layer. The composition of the lower part of the slag layer in the lower zone will change very slowly. This staves off its sharp overoxidation and fluidizing of the metal bath due to the evolution of the reaction of decarburization which may disturb the process and cause throwing out of the melt. This improves the stability and reliability of the process.

To increase the efficiency of fuel utilization, it is good practice in the course of melting that the oxygen-containing gas should be additionally delivered above the melt surface in an amount of $(0.01-5.0) \times 10^3 Nm^3$ per ton of solid carbon fuel. In this case the oxygen of the oxygen-containing gas reburns CO and $H_2$ released from the melt as a result of incomplete fuel combustion and reduction of iron oxides with carbon, to $CO_2$ and $H_2O$. This is accompanied by liberation of a considerable amount of heat part of which is conveyed to the melt and utilized for carrying out the process. The delivery of the oxygen-containing gas at the rate of $5.0 \times 10^3 Nm^3$ per ton of solid carbon fuel is quite sufficient for complete reburning of the gases emitted from the bath. The delivery of the oxygen-containing gas in an amount exceeding $5.0 \times 10^3 Nm^3$ per ton of fuel increases the content of free oxygen ($O_2$) in the discharged gases, causes overexpenditure of oxygen containing gas and impairs the thermal performance of the furnace. The delivery of the oxygen-containing gas in an amount lower than $0.01 \times 10^3 Nm^3$ per ton of solid carbon fuel is impracticable, since there occurs no reburning and oxygen is spent only for gasifying the fine solid carbon fuel thrown out of the melt.

When melting is conducted with additional delivery of the oxygen-containing gas above the melt surface (with reburning) with concurrent loading of iron-bearing material and solid carbon fuel, the latter should better be taken in the amount of 0.2 to 5.0 t/h per $m^2$ of the horizontal section area of the melt at the level of feeding the oxygen-containing gas into said melt.

These limits are based on the hydrodynamics of the bath and thermal conditions of the process, on intensities of delivery of oxygen-containing gas into the melt and above its surface. An amount of solid carbon fuel less than 0.2 t/h per $m^2$ of the horizontal section area of the melt at the level of delivery therein of the oxygen-containing gas prevents achieving a low partial pressure of oxygen in the melt, which reduces the ectraction of metal from the iron-bearing material into the intermediate product and increases the losses of metal with slag. The amount of solid carbon fuel exceeding 5.0 t/h per $m^2$ of the horizontal section area of the melt at the level of delivery thereto of the oxygen-containing gas brings about super saturation of the melt with solid carbon fuel, reduces the flowability of the melt and slows down the processes of heat-and-mass exchange; this, in turn, decreases the melting and reduction speeds.

The object of the invention is attained also by providing a furnace for the realization of the method, comprising a melting pot with a hearth, a stack resting on the melting pot and having at least one device for loading the iron-bearing material and solid carbon fuel into the melting pot, said device located in the upper part of the stack, tuyeres with nozzles for delivering the oxygen-containing gas into the melting pot which has a slag discharge channel made in the wall of the melting pot at its hearth, and a channel for discharging the ferrocarbon intermediate product made in the wall of the melting pot below the installation level of tuyeres with nozzles, and a device for discharging the process gases, located in the upper part of the stack wherein, according to the invention, the horizontal sections of the melting pot and stack have, essentially, a rectangular shape, the tuyeres with nozzles are installed in the upper portion of the longer walls of the melting pot, the slag discharge channel and the channel for the discharge of ferrocarbon intermediate product are made in the shorter walls of the melting pot, the ratio of the horizontal section area of the melting pot at the installation level of the tuyeres with nozzles to the total area of the tuyere outlet orifices being 300 to 10000, and the distance from the lower boundary of the channel for discharging the intermediate product to the upper boundary of the slag discharge channel is 0.3 to 0.75 of the distance from the lower boundary of the intermediate product discharge channel to the installation level of tuyeres with nozzles in the melting pot.

The furnace for the production of ferrocarbon intermediate product for use in steel manufacture comprises a melting pot with a hearth, a stack resting on the melting pot and provided with at least one device for loading the iron-bearing material and solid carbon fuel into the melting pot said device being located in the upper part of the stack, tuyeres with nozzles for feeding the oxygen-containing gas into the melting pot which is provided with a channel for discharging the ferrocarbon intermediate product made in the melting pot wall below the tuyere installation level and a slag discharge channel made in the melting pot wall at its hearth, and a device for discharging the process gases from the stack located in its upper part, the melting pot and the stack being, essentially, of a rectangular shape in the horizontal section, tuyeres with the nozzles are installed in the upper portion of the longer walls of the melting pot so that the ratio of the horizontal section of the melting pot at the installation level of the tuyeres with nozzles to the total area of the nozzle outlet orifices is 300 to 10000 and the channels are made in the shorter walls of the melting pot so that the distance from the lower end of the product discharge channel to the upper end of the slag discharge channel is 0.3 to 0.75 of the distance from the lower boundary of the product discharge channel to the tuyere installation level in the melting pot.

Realization of the melting pot and stack of the rectangular shape in the horizontal section and location of the tuyeres with nozzles for the delivery of the oxygen-containing gas into the melt on its counteropposed longer side walls to face each other ensures the conditions for an intensive stirring of the melt throughout its volume and, in addition, makes it possible to increase the furnace capacity by increasing its length at a constant width. Intensive stirring ensures high speeds of oxidation of solid carbon fuel, of melting of the iron-bearing material and reduction of metal oxides from slag and, consequently, optimum process characteristics i.e. high furnace output and low fuel consumption.

The arrangement of the tuyeres with nozzles in the upper portion of the melting pot walls makes it possible to create a zone of quiescent melt in the lower portion of the melting pot.

The ratio of the horizontal section area of the melting pot at the installation level of the tuyeres with nozzles to the total area of the nozzle outlet orifices exceeding 10000 results in a low bubbling intensity or in the need for resorting to excessively high feed velocities and pressure of the oxygen-containing gas which impairs the performance of the tuyeres and raises the cost of power-engineering equipment. The ratio below 300 is not expedient due to formation of an excessively large volume of oxidizing zones in the melt, which results in a reduced speed of reduction and a danger of melt throwout, and also due to the necessity of using low speeds of discharge of the oxygen-containing gas into the melt, which may bring about flooding of the nozzles with the melt.

Arranging the channels in the opposite shorter walls of the melting pot and the above-specified distances from the lower boundary of the channel for discharging the metal—intermediate product—to the upper boundary of the slag discharge channel ensure optimum conditions for the separation of metal and slag, prevent losses of solid carbon fuel and metal with slag, thus making it possible to increase the extraction of metal and reduce the consumption of solid carbon fuel. When the distance between the lower boundary of the metal discharge channel and the upper boundary of the slag discharge channel is smaller than 0.3 of the distance from the lower boundary of the metal discharge channel to the installation level of the tuyeres with nozzles, the slag discharge channel will be accomplished directly above the layer of metal. This will cause the absence of a slowly replaceable slag layer above the metal and a reduction in the process stability fluctuations in the chemical composition of slag in the upper bubbled zone. When the distance from the lower boundary of the metal discharge channel to the upper boundary of the slag discharge channel is larger than 0.75 the distance from the lower boundary of the metal discharge channel to the tuyere installation level, particles of solid carbon and metal drops are carried out with slag, which increases the consumption of solid carbon fuel and cuts down the furnace output.

All the above-listed measures taken together make for a high output combined with absolute reliability of the furnace, improve the separation of metal, i.e. intermediate product, for use in steel and slag manufacture and ensure a high percentage of metal extraction from the raw material being processed at a lower consumption of carbon fuel.

With a view to reducing the consumption of refractories and extending the duration of furnace interrepair periods, it is expedient that the upper part of the melting pot and at least the lower part of the stack be made cooled. If so, the cooled surfaces become covered with slag crust, which contributes to a reduction of heat losses.

The tuyeres with nozzles for the delivery of the oxygen-containing gas into the melting pot should better be installed in the cooled part of the melting pot, since above the tuyere axes and somewhat lower there appears a bubbled melt zone, wherein the corrosive slag laden with solid particles of fuel and iron-bearing material moves intensively, washing the furnace walls.

A substantial advantageous feature also consists in that the furnace comprises a slag precipitation vat with a slag discharge hole communicating with the melting pot through its slag discharge channel, the average area of the horizontal section of the slag precipitation vat being 0.03 to 0.3 the average horizontal section area of the melting pot.

The provision of the slag precipitation vat provides for a finer separation of slag and small droplets of metal. The attendant increase in the path of the slag to the point of discharge from the furnace and low speeds of lifting the slag to the reservoirs for its discharge favour the coalescence precipitation of metal drops from the slag. If the average horizontal section area of the slag precipitation vat is smaller than 0.03 the average horizontal section area of the melting pot, the rate of precipitation of metal drops is lower than the speed of slag lifting into the precipitation reservoirs, so that in this case there is no reduction of losses of metal with the discharged slag. The average horizontal section area of the slag precipitation vat larger than 0.3 the horizontal section area of the melting pot does not bring about further reduction of metal losses with slag but leads to supercooling of the latter, hinders its discharge or steps up the consumption of fuel spent for superheating the slag in the furnace or for its heating in the precipitation reservoir.

The vertical distance from the melting pot hearth to the lower edge of the hole in the slag precipitation vat should better be set within 1.1 to 2.5 the distance from the melting pot hearth to the installation level of the tuyeres with nozzles in it.

All other conditions being equal, the relation of said distances governs the relation between the heights of the bubbled and quiescent zones of the slag melt.

When the distance from the level of the melting pot hearth to the lower edge of the hole in the slag precipitation vat are less than 1.1 the distance from the hearth to the installation level of the tuyeres with nozzles, the height of the quiescent zone and, consequently, the thickness of the quiescent layer of slag will be small. This will impair the separation of metal from slag and the refining of metal, for example, from sulphur. The maintenance of the sulphur content at a present level will call for raising the basicity of slag by increasing the flux consumption and, as a consequence, will raise the fuel consumption and reduce the output. At distances from the melting pot hearth to the lower edge of the hole in the slag precipitation vat exceeding 2.5 the distance from the hearth to the installation level of tuyeres with nozzles the thickness of the quiescent layer of slag grows. However, this does not improve further the refining of metal and does not reduce metal content in the discharged slag; instead, it reduces the temperature of metal and increases heat losses.

To achieve reliable continuous output of the intermediate product and stabilize its level in the melting pot, it is practicable that the furnace have a reservoir for settling of the intermediate product with a hole for its discharge communicating with the melting pot through a channel for discharging the product therefrom.

In the absence of such a reservoir the product may be discharged either periodically or continuously through a calibrated channel which provides for a constant speed of metal outflow. However, in this case there is a need for sophisticated facilities for shutting down the channel under pressure. It is difficult to maintain a constant cross section of the channel in the direction of metal discharge and still more difficult to adjust the channel cross section for changing the metal discharge upon changes in the furnace output or when it is necessary to change the metal level in the melting pot. Thus, the furnace wherein the metal is discharged through a calibrated channel is insufficiently reliable. If a reservoir has a metal discharge hole, the metal is drained without pressure over the threshold of said hole. The metal level in the melting pot can be adjusted by changing the level of the threshold of the hole discharging metal from the reservoir.

This ensures reliable maintenance of the melt level in the furnace, higher flexibility of its adjustment and elimination of emergency situations. The result is stabilization and flexible governing of the process which, in the long run, steps up the output.

It is practicable that the upper part of the stack should be provided with at least one horizontal row of additional tuyeres for feeding oxygen-containing gas into the melting pot.

This method of tuyere installation permits the oxygen-containing gas to be fed for reburning the combustible gases emitted from the bubbled melt and ensures utilization of the heat of gases directly in the furnace. The immediate result is a lower fuel consumption and a higher output. The tuyeres installed in more than one row along the horizontal contribute to uniformity of reburning.

It is deemed expedient that the distance from the melting pot bearth to the installation level of the additional tuyeres of any row in the upper part of the stack should be 1.5 to 6.0 the distance from the melting pot hearth to the installation level of the main tuyeres in said pot. If the distance from the of the melting pot to the additional tuyeres for feeding the oxygen-containing gas above the upper zone of the bubbled melt is less than 1.5 the distance from the melting pot hearth to the installation level of main tuyeres this leads to oxidation of solid carbon fuel from the bath with the oxygen-containing gas delivered for reburning. In this case the melt bath may be superoxidized. This will step up the consumption and reduce the output.

If the distance from the hearth of the melting pot to the additional tuyeres for feeding the oxygen-containing gas above the upper zone of the bubbled melt is less than 6.0, the distance from the melting pot hearth to the installation level of the main tuyeres with nozzles for feeding the oxygen-containing gas into the melt, this proves inexpedient, since the flame of the burning gases emitted from the bath will be located too high above the melt surface. This impairs heat transfer to the bath and reduces the efficiency of the process.

It is expedient that the horizontal section area of the stack at the installation level of the additional tuyeres of any row should be 1.05 to 2.0 the horizontal section area of the melting pot at the installation level of the main tuyeres with nozzles feeding the oxygen-containing gas into the melt.

Heat transfer from the reburning zone to the melt preceeds in two ways, i.e. by radiation of the flame jet to the melt and by convection, mostly due to heating of the metal sphlashes flying from the melt bath to the reburning zone. The amount of heat received by the melt due to radiation depends on the area of projection of the surface of the bubbled melt on the horizontal surface while the amount of heat transferred by convention depends on the mass and flying height of the sphlashes which depend on the specific intensity (per unit area) of gas discharge through the melt surface.

As a consequence, when the cross-sectional area of the stack at the installation level of additional tuyeres exceeds 2.0 the horizontal section area of the melting pot at the installation level of the main tuyeres, there is no further imporvement of heat transfer by radiation; besides, the heat transfer by convection is reduced. In addition, an increase in the surface area of the walls results in higher heat losses. As a result, the total amount of heat received by the bath due to reburning is reduced.

When the horizontal section area of the stack at the installation level of additional tuyeres for feeding the oxygen-containing gas above the level of the upper zone of slag melt is less than 1.05 the horizontal section area of the melting pot at the installation level of the main tuyeres with nozzles for the delivery of the oxygen-containing gas into the melt there is no heat transfer by convection but the heat transfer by radiation is reduced due to a disminished area of the surface of the bubbled melt: besides complete reburning directly above the surface of the bubbled melt is also reduced. Thus, when the above-specified limits are violated, the furnace output drops while specific consumption of solid carbon fuel grows.

It is expedient that at least the lower part of the stack in its vertical cross section be made in the form of a trapezium whose smaller base rests on the melting pot.

In the course of bubbling the melt level rises and its upper zone, which is a gas-liquid system, is situated in the lower part of the stack. If the stack at this point has the shape of a tropezoid with its smaller base facing down, this increases the area of the surface of the bubbled melt. As a result, the surface area receiving the heat transferred by radiation from the reburning zone increases. Besides, the volume of the reburning space in the stack increases too. This ensures advantageous conditions for mixing the oxygen-containing gas with the combustible gases envolved from the melt and for reburning said gases directly above the melt with a higher degree of completeness.

BRIEF DESCRIPTION OF DRAWINGS

Now the invention will be made more apparent by referring to its specific embodiments and the accompanying drawings, in which:

FIG. 1 is a schematic general view of a furnace for the preparation of ferrocarbon intermediate product use in steelmaking (transverse vertical section), according to the invention;

FIG. 2 is a view along line II—II in FIG. 1;

FIG. 5 is a general view of a furnace for preparation of ferrocarbon intermediate product for use in steel manufacture, provided with a slag precipitation vat and an intermediate product precipitation vat (longitudinal vertical section), according to the invention;

FIG. 6 is a general view of a furnace for preparation of ferrocarbon intermediate product for use in steel manufacture provided with additional tuyeres for the delivery of oxygen-containing gas (vertical transverse section), according to the invention;

THE BEST WAY OF CARRYING THE INVENTION INTO EFFECT

Figure 3:
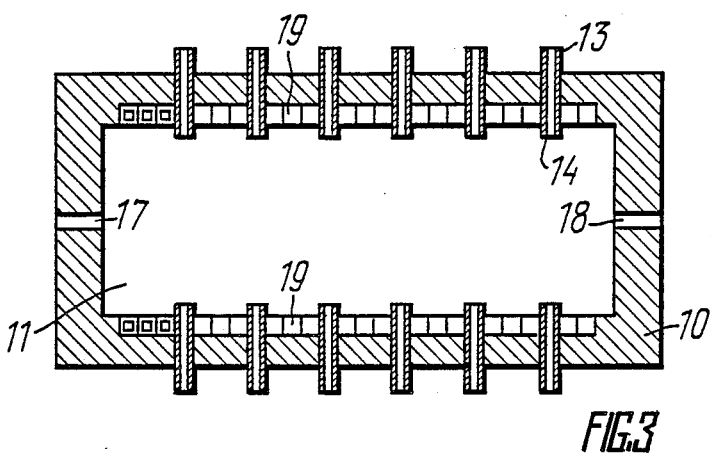
FIG. 3 is a view along line III—III in FIG. 2.

The hereinproposed method for the preparation of ferrocarbon intermediate product for use in steel manufacture comprises the following technological operations.

The furnace is charged simultaneously with iron-bearing material 1 (FIG. 1) and solid carbon fuel 2. Concurrently with charging, the furnace is fed with oxygen-containing gas 3 whose oxygen oxidizes part of fuel 2 accompanied by liberation of heat. This liberated heat melts iron-bearing material 1 and the metal oxides it contains are reuced by the carbon of the remaining part of fuel 2 forming liquid melting products, i.e. slag 4 (FIG. 2) and ferrocarbon intermediate product 5.

Then the slag 4, intermediate product 5 and process gases 6 formed in the course of melting are discharged from the furnace.

According to the invention, concurrent charging of the iron-bearing material 1 and solid carbon fuel 2 is preceded by building up slag melt. This is done by pouring in liquid slag produced in the manufacture of ferrous metals, for instance, in electric furnaces.

In another embodiment, the beginning of melting process is speeded up and the wear of the lining is reduced by pouring in liquid metal before pouring in slag, the liquid metal being poured higher than its discharge level but lower than the slag discharge level. The liquid may be either cast iron or some other ferrocarbon melt.

In a third embodiment resorted to in the absence of liquid slag the slag melt is built up by loading solid oxide materials into the furnace and melting them therein. The solid oxide materials may be represented by slags produced in the manufacture of ferrous metals (blast furnace, converter, open hearth, electric furnace slags, etc.), minerals (dolomite, limestone, sand, spar, etc.), metal oxides (CaO, MgO, $SiO_2$, $Al_2O_3$, etc.). These materials may belong to any one of the mentioned groups or to some of them simultaneously.

Then oxygen-containing gas 3 is fed into the built up melt, below its surface level. The oxygen-containing gas 3 can be either commercial oxygen (99.5% $O_2$) commercial oxygen (95% $O_2$), or oxygen-enriched air.

The stream 7 (FIG. 1) of oxygen-containing gas 3 divides the melt into two zones, viz., lower zone 8 of the quiescent melt and upper zone 9 of the melt bubbled with gas 3.

To simplify the subsequent discussion the term "lower quiescent zone 8" of the melt and "upper bubbled zone 9" of the melt will be used.

Then the upper bubbled zone 9 is loaded with solid carbon fuel 2 in an amount sufficient for building up a volumetric concentration of fuel within 0.5 to 50% of the total melt volume in said zone. These limits are selected on the one hand due to the necessity for oxidizing the fuel 2 in the melt with the oxygen-containing gas 3 and forming CO and, on the other hand, with a view to preserving the flowability of the melt. A specific value of the concentration is determined by taking in account the amount of the delivered oxygen-containing gas, the properties of slag 4, the type and properties of the solid carbon fuel, and other parameters of the process.

Further on, the concentration of solid carbon fuel is maintained by simultaneous charging of the upper zone 9 with the iron-bearing material 1 and solid carbon fuel 2.

The solid carbon fuel may be constituted by various kinds of carbon-containing materials, preferably coal. Alternative fuels are brown coal, peat, charcoal, coke byproducts, schungite, shale, anthracite, products of pyrolysis of carbon-containing organic materials and carbon-bearing waste (plastics, rubber, etc.).

The processed iron-bearing material may be iron ore, iron-ore concentrate and iron-ore raw materials reduced to various extents (sponge iron). The method proves effective in processing dried slimes, dust formed in dry gas purifiers of metallurgical industry, scale, including oiled scale. Also possible is remelting of fine steel and cast iron scrap, particularly chips.

The bubbled zone 9 created by injection of oxygen-containing gas 3 into the melt and by subsequent loading it with solid carbon fuel 2 and iron-bearing material 1 is a complicated heterogeneous system comprising slag melt, gaseous phase, particles of solid carbon fuel, particles of solid iron-bearing material, drops of molten iron-bearing and drops of metal—intermediate product—obtained by reduction of metal oxides from the slag metal. This system is mixed by the energy of the injected oxygen-containing gas 3 delivered in the amount of 150 to 1500 $Nm^3/h$ per $m^2$ of the horizontal section area of the melt at the delivery level of the oxygen-containing gas 3 according to the type of fuel, properties of the slag melt, oxygen content in the oxygen-containing gas, desired output, etc.

The flow rate of the oxygen-containing gas 3 delivered into the melt is increased when the reactivity of the solid carbon fuel 2 increases.

The result is the interaction of the iron-bearing material 1, solid carbon fuel 2 and oxygen-containing gas 3 accompained by the formation of liquid slag 4 and liquid metal, i.e. ferrocarbon intermediate product 5 used in steel manufacture.

In the bubbled zone 9 of the melt the oxygen-containing gas 3 interacts with the carbon of the solid carbon fuel 2.

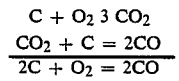

The interaction yields energy necessary for preparation of ferrocarbon product 5 from the iron-bearing material 1.

To improve the functioning of the injection devices, to speed up the interaction of the oxygen contained in the oxygen-containing gas 3 with the fuel 2, to reduce the volume of the gas oxidizing zones in the melt 4 and to improve the thermal coditions the bubbled zone 9 of the melt is additionally fed, under the melt surface, with liquid, gaseous or solid pulverized carbon-containing fuel. The gaseous, liquid or pulverized solid carbon-containing fuel is best delivered jointly with the oxygen-containing gas. This contributes to efficient mixing and burning of the fuel within a short portion of the one of fuel delivery into the melt.

The iron-bearing material 1 in a cold or preliminarily heated state enters the bubbled zone 9 and is assimilated with the slag melt wherein it is heated and melted. The metal component of the iron-bearing material 1 forms metal drops which descend into the lower quiescent zone 8 of the melt, forming a layer of metal i.e. ferrocarbon intermediate product 5 for use in steel manufacture or continuously replenishing this layer. Melting, the oxide component of the iron-bearing material dissolves in the slag of the bubbled zone 9, thus increasing the content therein of the oxides of iron, manganese, silicon, etc.

The oxides of iron and other metals, e.g. silicon, manganese nickel, chromium, etc. are reduced from the slag melt by the carbon of the solid carbon fuel.

$$(Fe_2O_3) + 3CO = 2Fe + 3CO_2$$
$$\underline{3CO_2 + 3C = 6CO}$$
$$(Fe_2O_3) + 3C = 2Fe + 3CO.$$

The metal drops formed through reduction are coagulated and descend by gravity in the quiescent zone 8 through the layer of slag 4 into the metal layer 5.

The layer of slag 4 in the quiescent zone 8 is renewed by the slag melt flowing from the bubbled zone 9.

Thus, the quiescent zone 8 consists of an upper layer of slag 4 and a lower layer of metal 5.

The liquid products of melting, i.e. metal, (ferrocarbon intermediate product 5) and slag 4 are discharged separately from the corresponding layers of the calm zone 8. The metal 5 is discharged from the lower part of its layer. Slag 4 can also be discharged from the lower part of the slag layer. However, for a better stability of the process, the slag 4 is discharged from the middle or upper parts of its layer in the quiescent zone 8.

As the drops of metal 5 interact with the slag 4, the metal is refined from impurities (sulphur, phosphorus). The chemical composition of slag 4 is adjusted by loading fluxed additions into the bubbled zone 9. As distinct from the blast-furnace melting, the composition of slag may vary within wider limits, which improves its refining property and produces a purer metal.

The main part of sulphur introduced mostly with the solid carbon fuel can be removed with the discharged gases 6 in the form of gaseous compounds (COS, $H_2S$, etc.). For a better removal of sulphur into the gaseous phase and for producing a low-sulphur metal, the oxygen-containing gas 3 is fed into the melt in the course of melting continuously, periodically stopping the concurrent loading of the iron-bearing material 1 and solid carbon fuel 2. It provides for periodic additional refining from sulphur of the slag melt in the bubbled zone 9, thereby raising its sulphur absorbing capacity.

The gases 6 evolved in the bubbled zone 9 are liberated from the melt and discharged from the furnace. These gases 6 consist chiefly of CO and $H_2$, their temperature approaching that of the melt. They can be used as a gaseous fuel or as a process reducing gas, for example for direct production of iron or for injection into blast furnaces.

However, when reducing gas is produced as a result of melting, this is accompanied by the release of a comparatively small amount of heat. Therefore, to obtain a sufficiently high efficiency of the method for preparing ferrocarbon, product, the iron-bearing material should preferably be respresented by previously reduced iron-ore raw materials or small-size metal scrap.

The additional feed of the oxygen-containing gas 3 above the level of the bubbled melt zone 9 ensures a more effective utilization of the energy of the solid carbon fuel, as well as of the liquid, gaseous or solid pulverized carbon-containing fuel directly in the process for preparing the ferrocarbon intermediate product. In this case the CO and $H_2$ liberated from the melt are reburned partly or completely to $CO_2$ and $H_2O$:

$$CO + \tfrac{1}{2}O_2 = CO_2$$

$$H_2 + \tfrac{1}{2}O_2 = H_2O.$$

The heat released by these exothermic reactions heats the slag in the bubbled zone 9 and is spent for melting the iron-bearing material 1 and reducing the oxides of its metals. The additional heat permits raising the efficiency of the process or using the iron-ore raw materials without preliminary reduction, at the same time retaining the high output.

During complete reburning of the gases released from the melt in the course of melting, only noncombustible gases are produced and discharged. This simplifies substantially the utilization of their energy, since effective utilization of the sensible heat of gases can be achieved by far easier than by the use of their chemical heat.

The oxygen-containing gas 3 delivered above the level of the bubbled zone 9 of the melt is constituted by commercial oxygen (95% $O_2$), or air enriched with commercial oxygen, or air as such.

The oxygen-containing gas 3 delivered above the level of the bubbled zone 9 of the melt is delivered at the rate of (0.01 to 5.0) $\times 10^3 Nm^3$ per t of solid carbon fuel depending on the chemical composition of the solid carbon fuel, oxygen content in the oxygen-containing gas, the requisite degree of reburning, etc.

In the course of concurrent loading of solid carbon fuel 2 and iron-bearing material 1 the fuel is loaded at the rate of 0.2 to 0.5 t/h per $m^2$ of the horizontal section area of the melt at the level of delivery into it of the oxygen-containing gas 3. The amount of fuel is selected on the basis of the flow rate of the oxygen-containing gas delivered into the melt, the oxygen content is said gas, the chemical composition of the solid carbon fuel and the degree of reburning. High values are characteristic of the fuel with a low carbon content also of melting the iron-ore raw materials at high degrees of reburning of the gases discharged from the melt.

The hereinproposed method is realized in the best possible way by means of the hereinproposed furnace comprising a melting pot 10 (FIG. 1 and 2) with hearth 11, stack 12 resting on top of said melting pot 10, tuyeres 13 with nozzles 14 (FIG. 2) delivering the oxygen-containing gas 3 into the melting pot 10 and a means 15 in the top part of the stack for discharging the process gases 6 from the furnace. Besides, stack 12 is provided with at least one device 16 for charging the iron-bearing material 1 and solid carbon fuel 2 into the melting pot 10. The melting pot 10 has a channel 17 for taking out slag 4, said channel made in the wall of the melting pot 10 at its hearth 11, and a channel for discharging the metal, i.e. ferrocarbon intermediate product 5 referred to hereinafter simply as "metal" 5, said channel being also made in the wall of the melting pot 10 below the installation level of tuyeres 13.

According to the present invention the melting pot 10 and stack 12 are substantially rectangular in the horizontal section. The upper part of the melting pot 10 and at least the lower part of the stack 12 have cooling elements 19. The cooling agent is either water or some other similar heat-transfer agent. The tuyeres 13 (FIG. 3) with nozzles 14 for the delivery of oxygen-containing gas into the melting pot 10 are installed in its upper cooled part on the opposite longer sides of the pot 10, facing each other. The ratio of the horizontal section area of the melting pot 10 at the installation level of tuyeres 13 and nozzles 14 to the total area of the outlet orifices of nozzles 14 ranges from 300 to 10000.

These limits permit the oxygen-containing gas to be delivered into the melt at a flow rate proposed in the present method for preparing the ferrocarbon product at optimum velocities which ensure, on the one hand, efficient stirring of the melt and, on the other hand, high stability and reliability of tuyeres 13 and nozzles 14.

The slag discharge channel 17 is made in one of the shorter wall of the melting pot 10, while the channel 18 for the discharge of the intermediate product is made in the opposite shorter wall of the pot 10, at its hearth 11.

The distance h from the lower boundary of the metal-discharge channel 18 to the upper boundary of the slag discharge channel 17 is 0.3 to 0.75 the distance H from the lower boundary of the channel 18 to the installation level of tuyeres 13 with nozzles 14 in the melting pot 10. The installation level of tuyeres 13 is measured from the surface of the hearth 11 to the longitudinal geometrical axes of tuyeres 13.

At the above-mentioned ratio the slag is discharged from optimal levels along the height of its layer. This ensures, on its one hand, presence of a slowly replaceable slag over the metal, this contributing to an increase in the process stability when the degree of slag oxidation in the bubbled zone is increased, and, on the other hand, precluding losses of particles of solid carbon fuel and metal slags with the slag being discharged.

Figure 4:
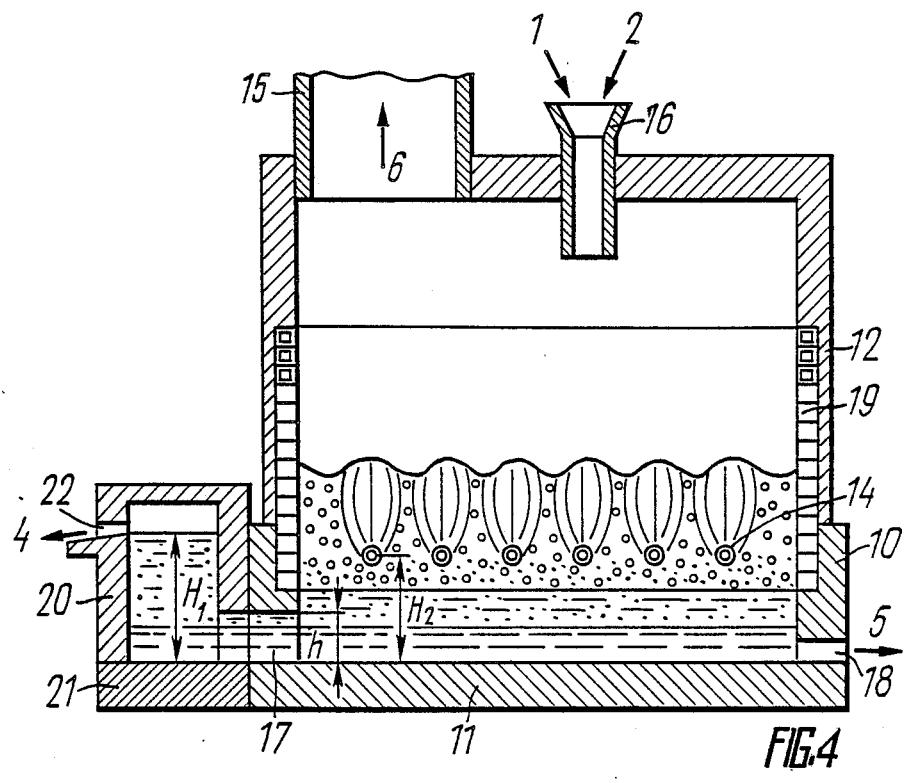
FIG. 4 is a general view of a furnace for preparation of ferrocarbon intermediate product for use in steel manufacture, provided with a slag precipitation vat (longitudinal vrtical section), according to the invention.

The furnace comprises also a slag precipitation vat 20 (FIG. 4) with a hearth 21, said vat having a hole 22 for discharging slag into the slag pot (not shown in the Figure) and communicating with the melting pot 10 through the channel 17. This design of the furnace and the provision of the vat 20 makes it possible to discharge the slag continuously as it is formed. The threshold of the discharge hole 22 defines the level of the melting bath in the furnace. By changing the height of the threshold one can change the melt level in the furnace.

The average horizontal section area of the vat 20 is 0.03 to 0.3 the average horizontal section area of the melting pot 10.

Such values of the average horizontal section area of the vat 20 with relation to the average horizontal section area of the melting pot 10 provide for effective separation of small droplets of metal 5 from slag 4 in the pot 10.

The hearth 21 of the vat 20 is made level with the hearth 11 of the melting pot 10. The lower level of the channel 17 coincides with the level of hearths 11 and 21. As a result, the metal drops 5 separated in the vat 20 from slag 4 accumulate in a layer on the hearth 21, and metal 5 returns into the melting pot 10 through channel 17.

The vertical distance $H_1$ from the level of the hearth 11 to the lower edge of the discharge hole 22 is 1.1 to 2.5 the distance $H_2$ from the level of the hearth 11 to the installation level of tuyeres 13 with nozzles 14 in the melting pot 10. The distances $H_1$ and $H_2$ are equal when the metal discharge channel 18 is located at the hearth 11 of the melting pot 10. This ensures optimum relationships between the heights of the bubbled zone and calm zone 8 of the melt and, consequently, the optimum height of the layer of clam slag 4 at which said layer allows for effective separation of metal drops and their refinement from impurities without imparing the heat transfer to the metal layer abd without increasing heat losses.

To ensure reliable and continuous discharge of metal and to stabilize the metal level in the furnace, the latter is fitted at the end side with an external vat 23 (FIG. 5) for precipitation of the intermediate product, i.e. metal 5, said vat communicating with the melting pot 10 through the metal discharge channel 18. The vat 23 has a hearth 24 arranged level with the hearth 11 of the melting pot 10. The vat 23 has a hole 25 for discharging metal into the ladle (not shown in the drawing) whose threshold level determines the height of the metal layer 5 in the quiescent zone 8 of the melt in the melting pot 10.

In order to utilize the energy of combustible process gases 6 evolved from the melt for improving its thermal efficiency and the utilization effect of the solid carbon fuel, the furnace is equipped with additional tuyeres 26 (FIG. 6) with nozzles 27 for feeding the oxygen-containing gas into the melting pot 10 above the level of the bubbled zone 9 of the melt. The tuyeres 26 are arranged in one or more rows along the height of the stack 12 in arches 28 made in its longer walls. The tuyeres 26 are installed with a provision for moving along their axes into the stack over a distance of up to 0.5 of its width at the point of installation of the tuyeres 26 and with a provision for changing the inclination angle of the tuyere axes from 0° to 60° to the horizontal. The tuyeres 26 are moved into the stack 12 and the angle of the tuyeres 26 to the horizontal is changed by special mechanical means (not shown in the Figure).

Figure 7:
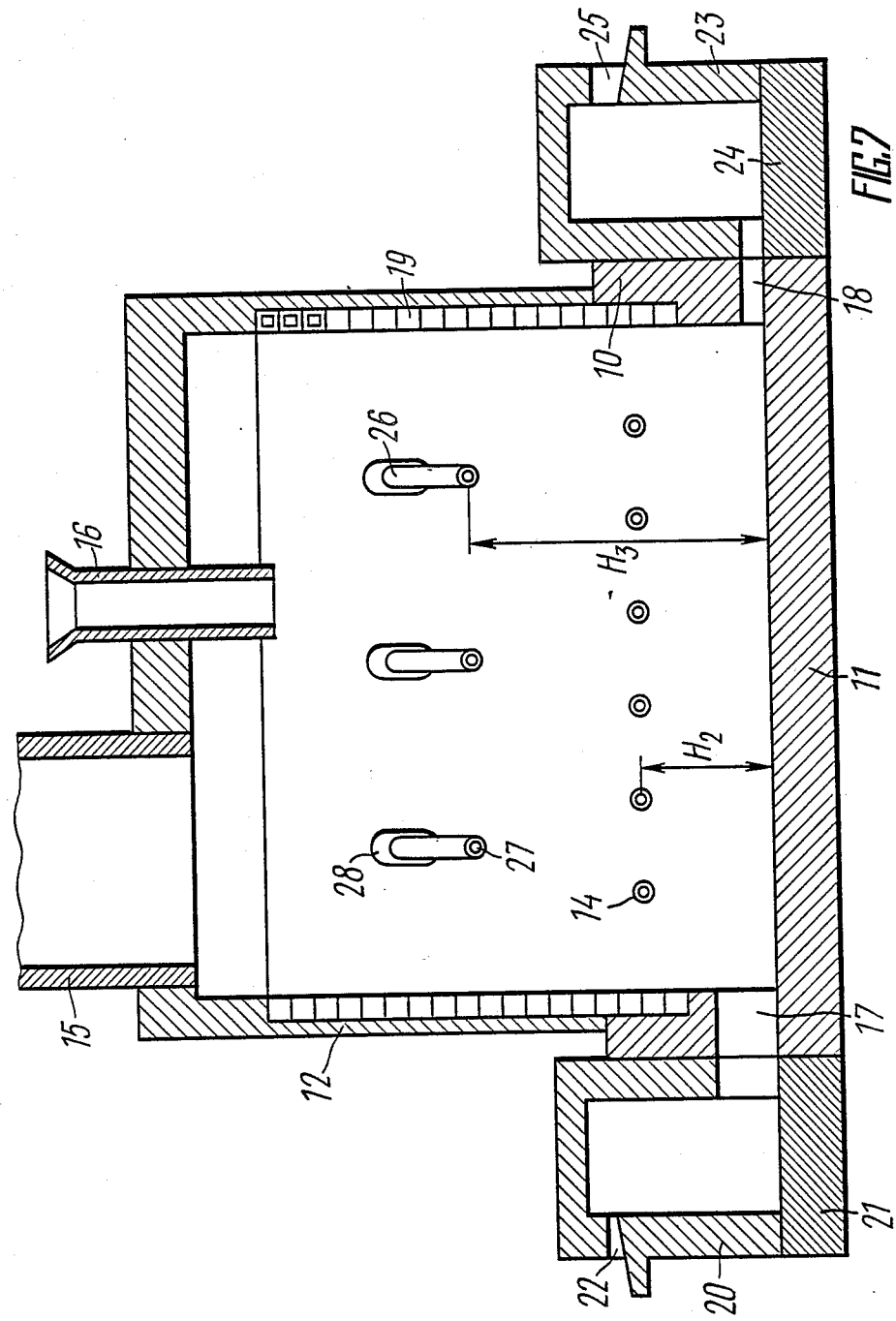
FIG. 7 is a view along line VII—VII in FIG. 6.

To ensure high degrees of reburning and efficient heat transfer from the flame jet to the melt and to prevent burning the solid carbon fuel by the oxygen-containing gas delivered above the level of the bubbled zone 9 of the melt, also to prevent overoxidation of the melt the tuyeres 26 (FIG. 7) are installed at a distance $H_3$ from the hearth 11, equal to 1.5 to 6.0 the distance $H_2$ from the hearth 11 to the installation level of the main tuyeres 13 with nozzles 14.

The installation level of the additional tuyeres 26 depends on the position of the lower edge of the outlet holes of the nozzles 27 in relation to the hearth 11.

For delivering oxygen-containing gas above the level of the bubbled zone 9 operating with reburning of the process gases in order to improve the heat transfer by radiation from the jet flame to the melt and thus to increase the utilization degree of the reburning heat, the lower part 29 of the stack 12 in the furnace with tuyeres 26 (FIG. 5) has the form of a trapezoid in the vertical cross-section, the smaller base of said trapezoid resting on the melting pot 10. The trapezoidal shape provides for widening the melting bath, for increasing the projection area of the melt surface in the bubbled zone 9 in the horizontal plane, and for increasing the stack volume above the melt in the reburning zone. The middle portion of the stack and the whole stack may also have a trapezoidal shape.

To increase the total degree of utilization of the reburning heat by optimizing the heat transfer by radiation and convection from the flame jet to the melt, the horizontal section area of the stack at the installation level of additional tuyeres 26 for feeding oxygen-containing gas above the level of the bubbled zone 9 of the melt is 1.05 to 2.0 the horizontal section area of the melting pot 10 at the installation level of the main tuyeres 13 with nozzles 14 for delivery of oxygen-containing gas to the melt. Within the above-specified limits the concrete value is selected on the basis of the flow rate of the oxygen-containing gas delivered into the melt, the degree of reburning, height of the melting bath and geometrical dimensions of the furnace.

The furnace for realizing the method for preparing the ferrocarbon intermediate product functions as follows.

To build up a slag melt, the melting pot 10 with a previously heated refractory lining is filled with liquid slag obtained as a byproduct in a blast furnace or an openhearth furnace or, else, in an electric steel melting furnace or with liquid synthetic slag first melted, for example, in a slag melting electric furnace. The slag is poured in to the level disposed above the installation level of the tuyeres 13 with nozzles 14. If the vat 20 is used, the maximum pouring-in level corresponds to the threshold level of the hole 22 for discharging slag from the vat 20.

In another embodiment before pouring slag into the furnace the latter is filled with liquid metal, preferably cast iron, to the level higher than the upper boundary metal discharge channel 18 but lower than the lower boundary of the slag discharge channel 17.

In the third method of building up slag melt the hearth 11 of the heated furnace is loaded with solid oxide materials, viz., crushed slags produced in the ferrous metal manufacture, mineral raw materials, metal oxides, and said materials are melted. The solid oxide materials are melted until the slag level in the furnace rises above the installation level of tuyeres 13 with nozzles 14.

If it becomes impossible for some reason to fill the furnace completely with liquid slag above the level of tuyeres 13 with nozzles 14, the available amount is poured in and the bath is subsequently built up with solid oxide materials. Having built up the slag melt, an oxygen-containing gas is fed into it, under the surface, through tuyeres 13 with nozzles 14 and, if need be, liquid, gaseous or solid pulverized carbon-containing fuel under a pressure exceeding the static pressure of the slag melt column above the tuyeres 13, at a consumption rate of 150–1500 $Nm^3/h$ per $m^2$ of the horizontal section area of the bath at the installation level of tuyeres 13 with nozzles 14.

Thus, the melt is divided into two zones, the upper bubbled zone 9 and the lower quiescent zone 8. When the upper zone 9 of the slag melt is higher and somewhat lower than the axes of tuyeres 13 with nozzles 14, it begins mixing intrensively, being turned into a gas-liquid system.

Then the melt is loaded from above through device 16 with solid carbon fuel 21, for example lump coal, with practically no limitations on the size of lumps because, due to a thermal shock in the bath and liberation of volatile components, the coal is disinegrated into practiles 3 to 4 mm in size, maximum. Other kinds of solid carbon fuel are used in the milled state.

The particales of solid carbon fuel 2 loaded into the bubbled melt of the upper zone 9 are distributed throughout the volume of the melt. The volumetric concentration of fuel is brought to 0.5 to 50% of the melt volume in the zone 9. Entering the tuyere zones, the particles of fuel 2 interact with the oxygen-containing gas, forming carbon monixide.

Due to the heat released through oxidation of fuel, the melt bath is heated to 1450° to 1650° C. Then solid carbon fuel 2 and iron-bearing material 1 begin to be concurrently loaded into the upper zone 9 of the bubbled melt through device 16. Meanwhile the volumetric concentration of solid carbon fuel 2 in the bubbled zone 9 of the melt is maintained within the same limits (0.5 to 50% of the melt volume in said zone).

On condition of ensuring sufficient output, the iron-bearing material 1 for preparing ferrocarbon product is constituted, for the process without reburning the process gases in the furnace by the materials containing mostly metallic iron (iron-ore raw materials (sponge iron) reduced in advance, small-size steel or cast iron scrap, chips; for the process with reburning, oxidized materials (iron ore, iron-ore concentrate, dust produced at gas-purifying works, dried slime).

For producing alloyed ferrocarbon product the charge is mixed with raw materials containing alloying elements (manganese, nickel and other ores and concentrates thereof).

Besides, in order to produce slag of a desired composition, the charge is mixed with fluxing additions of which the most common one is lime, through it can be substituted by crude limestone.

The iron-baring materials, alloying and fluxing additions, as well as solid carbon fuel, are loaded concurrently into the furnace through charging device 16.

The charge is delivered to the device 16 either mixed or by separate components by a belt conveyor (not shown in the Figure).

A large furnace may have several charging device 16.

As the charge materials fall into the melt, they become quickly and uniformly spread throughout the volume of its upper bubbled zone 9 due to mixing of the melt. A high intensity of melt movement, dispersion therein of the energy sources and uniform distribution of the charge materials provide favourable prerequisites for fast heating and melting of the iron-bearing material and additions. The permissible lump size of the iron-bearing material and additions depends on their properties, the properties of the slag, intensity of delivery of the oxygen-containing gas into the melt, the temperature of the process and may reach 20 to 30 mm.

Being melted, the metallic component of the iron-bearing material 1 forms, metal drops while the oxide component gets dissolved in the slag. The oxides, of iron and some other materials (Si, Mn, Cr, Ni, etc.) are reduced by the oxygen of the solid carbon fuel 2, forming metal drops.

The small metal droplets may stay for quite a long time in the bubbled zone 9. Here a stationary concentration of said droplets sets in, said concentration depending on the velocity of melt motion. As this concentration rises, the droplets coagulate, grow in size and already cannot stay in the upper bubbled zone 9. They sink into the lower quiescent zone 8, passing through the layer of quiescent slag 4 and join the layer of metal 5 on the hearth 11.

The large drops of metal formed by melting of the metal component of the iron-bearing material quickly precipitate from the upper bubbled zone 9. The melt temperature in the upper bubbled zone is higher than that in the lower quiscent zone 8. Heat enters the lower quiescent zone 8 mostly with the drops of metal 5 which get heated in the upper bubbled zone 9.

Owing to the high temperature in the upper bubbled zone 9 and the large boundary surface between the reacting phases, i.e. gas—solid carbon—liquid slag-metal the metal oxides become reduced at a high speed. As a result, the efficiency of the process is restricted, as a rule, not by the reduction kinetics, but by the supply of heat. The corrosive melt in the upper bubbled zone 9 and somewhat above contacts the cooling elements 19. Said elements 19 become covered with a layer of slag crust 5–25 mm thick, which averts large heat losses and protects them against abrasive attrition by the particles of solid carbon fuel 2 and iron-bearing material 1 contained in the upper bubbled zone 9 of the slag melt.

The melt of the lower part of the melting pot 10 where metal 5 and slag 4 come from the upper bubbled zone 9 contacts with the refractory brickwork. However, slag in this zone is considerably less corrosive since it already contains no solid articles, has a lower content of iron oxides and a low velocity of movement. Therefore the refractories in this zone are sufficiently stable.

A low velocity of the slag in the quiescent zone 8 provides favourable prerequisites for the precipitation of metal drops therefrom. This is accompanied by additional refining of metal drops from impurities.

The slag 4 is discharged from its layer in the quiescent zone 8 through channel the 17 in the end wall of the melting pot 10. By changing the height from the hearth 11 to the upper boundary of the channel 17 one can discharge slag from different heights of its layer. When the slag is discharged from the lower portion of its layer, this ensures a somewhat better separation of the metal drops from slag inside the melting pot 10. However, in this case the layer of slag directly adjoining the layer of metal is continuously renewed in the course of melting which may bring about a temporary increase in the oxidation state of slag in the lower quiescent zone 8 and may cause the metal to boil. This may affect adversely the stability of the process and of the refractory lining of the melting pot 10.

These phenomena are prevented by discharging the slag from the middle or upper parts of its layer in the quiescent zone 8. In this case there is an extremely slowly renewed layer of liquid slag on top of the liquid metal with an equilibrium content of iron oxides relative to the carbon content in metal.

The provision of slag precipitation vat 20 diminishes actually the losses of metal 5 with slag 4. Passing through the channel 17, slag 4 enters the lined vat 20 and proceeds moving upward. Owing to a relatively large horizontal section of the vat 20 the velocity of slag flow diminishes thus enabling the drops of metal to precipitate freely. Descending onto the hearth 21 of the vat 20, the drops fall into a metal bath communicating with the metal bath in the melting pot 10.

From the upper part of the vat 20 the slag flows by gravity over the threshold of the discharge hole 22 into the discharge chute (not shown in the Figure) and is taken into the slag pot or directly for reprocessing. If necessary, the vat 20 is heated by burners (not shown in the Figure).

With respect to the composition the lag produced in the course of this process approaches the blast furnace slag. Other compositions of the slag are also feasible which broadens the field of their utilization.

The metal 5 is discharged through channel 18 at the hearth 11 of the melting pot 10. The metal 5 can be discharged by opening the channel 18 periodically, through this changes the melt level in the melting pot 10, which impairs the stability and parameters of the process. Continuous discharge of metal 5 can be realized by maintaining the preset cross section of the channel 18, which makes for the metal discharge at a speed equal to the speed of its entering into the quiescent zone 8. However, such a metal discharge system is not quite reliable.

Reliable discharge of metal 5 and stable level of melt in the melting pot 10 are ensured by the provision of metal precipitation vat 23. Flowing through the channel 18, metal 5 enters the lower part of the vat 23, then rises, reaches the threshold of metal discharge hole 25 and flows by gravity into the chute (not shown in the Figure), wherefrom it is transferred into a ladle or mixer, or directly into as installation for further conversion.

The obtained metal is used as an intermediate product for making steel in oxygen converters, electric furnaces, extra-furnace refining plants, and other installations.

The chemical processes of reduction and burning occuring in the upper bubbled zone 9 yield process gases. These gases consist, basically, of CO and $H_2$ with a low content of $CO_2$ and $H_2O$. They also contain nitrogen liberated from solid carbon fuel and from oxygen-containing gas. Process gases 6 are evolved from the melt and discharged from the upper part of stack 12 through means 15 for the discharge of process gases.

Process gases 6 are used as fuel in furnace chambers. High quality characteristics of gases (ratio of reducing components to oxidizing ones) allow process gases 6 to be also utilized as a reducing agent in the processes of solid-phase direct reduction of iron, or in blast furnaces. The content of hydrogen in the process gases can be regulated by changing the moisture content of the charge and by delivering steam above the surface of the melt.

To raise the furnace output and cut down fuel consumption, also when there is no need nor possibility for using the reducing process gases in other installations, said gases are utilized partly or wholly directly in the furnace. For this purpose oxygen-containing gas 3 is delivered into the furnace stack 12 through additional tuyeres 26. The carbon monoxide and hydrogen evolved from the bath interact with the oxygen of the oxygen-containing gas 3 being oxidized to $CO_2$ and $H_2O$. By feeding different amounts of oxygen-containing gas 3 per ton of fuel it becomes possible to adjust the degree of reburning of process gases. Oxygen-containing gas 3 is fed as close as possible to the surface of the melt in upper bubbled zone 9 and distributed uniformly above said surface by adjusting the positions of the additional tuyeres 26. As a result, a reburning flame jet is formed above the melt. The splashes of slag and the solid particles getting into the flame jet blacken the latter intensively and, consequently, it becomes highly radiant.

While flowing through the flame, the slag splashes are heated and return into the bath, heating the latter. This provides for efficient transfer of reburning heat to the melt. The degree of utilization of reburning heat is increased by optimizing within 1.05 to 2.0 the ratio of the horizontal section areas of the stack in the reburning zone and in the melting pot 10 at the delivery level of oxygen-containing gas 3 into the melt and the distance from the hearth 11 to nozzles 27 of the additional tuyeres 26 within the limits of 1.5 to 6.0 the distance from the hearth 11 to the level of nozzles 14 of the tuyeres 13 and in accordance with other parameters.

After complete reburning in the furnace, discharge gases 6 contain virtually no combustible components and their utilization is confined only to the utilization of sensible heat.

The dust content in the discharge gases 6 is low because of the absence of distributed loading and good assimilation of the charge by the bubbled melt.

Given below are embodiments of the hereinproposed method for preparing ferrocarbon intermediate product for use in steel manufacture and a furnace for the realization thereof.

EXAMPLE 1

A melt bath in the furnace for preparing liquid ferrocarbon intermediate product for use in steel manufacture is formed by filling melting pot 10 with liquid blast-furnace slag at 1350° C., said slag having the following formula, %: SiO$_2$=35.9; MnO−0.5; S=1.4; Fe$_{tot}$=0.5; CaO=39.9; Mg=0 to 8.7; Al$_2$O$_3$=9.8; other oxides, the balance.

Oxygen-containing gas 3 (O$_2$=99.5%) is delivered below the melt surface through tuyeres 13 with nozzles 14 at the rate of 1500 Nm$^3$/h per m$^2$ of the horizontal section area of the melt. The ratio of the horizontal section area of melting pot 10 at the installation level of tuyeres 13 to the total cross-sectional area of nozzles 14 of said tuyeres is equal to 300.

The delivery of oxygen-containing gas below the surface of the melt brings about the formation of upper bubbled zone 9 and lower calm zone 8 of the melt.

Bubbled zone 9 is loaded through charging device 16 with coal, moisture content 5%, in an amount ensuring a volumetric concentration of 20% in upper bubbled zone 9 of the melt; then bubbled zone 9 is loaded concurrently with coal, through device 16, and concentrate having the following composition, %: total iron, 63.5; barren rock, 10.0. The iron-ore concentrate is loaded jointly with flux, i.e. lime, at the rate of 6 t/h. Iron-ore concentrate, flux and coal are supplied to charging device 16 by a belt conveyor.

The iron-ore concentrate, together with coal and flux gets into bubbled zone 9 of the melt, is heated, melted and reduced through interaction with coal. The heat required for keeping the melt hot, for heating, melting and reducing the raw material is produced by burning a part of coal due to interaction with the oxygen of oxygen-containing gas 3 supplied through tuyeres 13 with nozzles 14.

Growing in size, the drops of metal precipitate from the melt of bubbled zone 9, pass through the slag layer in lower clam zone 8 and build up a calm layer of metal melt.

The process gases evolved during melting, amounting to 123000 Nm$^3$/h are discharged from the furnace through a gas-discharge means 15. The composition of process gases, vol.% is as follows: Co=75.0; H$_2$=20.2; CO$_2$=2.0; N$_2$=1.0.

The slag produced during melting is discharged from the furnace through channel 17. Composition of discharged weight %: SiO$_2$=38.7; MnO=1.4; Fe$_{tot}$=4.0; CaO=38.4; MgO=8.9; Al$_2$O$_3$=10.6; Slag temperature, 1500° C.

The distance from the hearth of melting pot 10 to the upper boundary of slag discharge channel 17 is 0.3 the distance from the lower boundary of metal discharge channel 18 to the installation level of tuyers 13, whith ensures the discharge of slag from the level of the lower part of the slag layer in the lower calm zone 8.

The metal is discharged from the furnace through channel 18 located at hearth 11 of melting pot 10. Composition of discharged weight, %: C=4.5; S=0.030; P=0.11; Si=0.15; Mn=0.16; The temperature of metal at outlet is 1500° C. The furnace output is 35.4 t/h, coal consumption, 65 t/h, iron extraction, 96.85%, dust carryover, 1.2%.

EXAMPLE 2

The melting process is similar to that described in Example 1.

The ratio of the horizontal section area of melting pot 10 at the installation level of tuyeres 13 to the total cross-sectional area of nozxzles 14 of said tuyeres is 10000.

Oxygen-containing gas 3 (O$_2$=99.5%) is delivered at the rate of 150 Nm$^3$/h per m$^2$ of the horizontal section area of the melt. The furnace is loaded with sponge iron at the rate of 10 t/h; the sponge iron has the following composition, weight %: total iron=85, metallic iron=60, barren rock=10.0. The consumption of flux (lime) is 0.9 t/h. Volumetric concentration of coal in the melt of bubbled zone 9 is 0.5%. Composition of the produced metal, weight %: C=3.8; S=0.030; P=0.11; Si=0.15; Mn=0.16. Temperature of metal at outlet=1500° C. The slag is discharged through channel 17 into vat 20 where metal drops are additionally separated then slag is continuously discharged from vat 20 through hole 22. The average horizontal section area of the slag precipitating vat 20 is 0.03. the average horizontal section area of melting pot 10. The yield of process gases is 14500 Nm$^3$/h. Furnace output, 8.6 t/h, coal consumption, 8 t/h, iron extraction, 97.7%, dust carryover, 1.0%.

EXAMPLE 3

The melting process is conducted on the same lines as in Example 2. The ratio of the horizontal section area of melting pot 10 at the installation level of tuyeres 13 to the total area of the outlet orifices of nozzles 14 of said tuyeres is 450.

The average horizontal section area of the slag precipitation vat 20 is 0.3 the average horizontal section area of melting pot 10. The distance from the lower boundary of channel 18 of hearth 11 to the upper boundary of channel 17 is 0.75 the distance from the lower boundary of metal discharge channel 18 to the installation level of tuyeres 13.

The vertical distance from hearth 11 of melting pot 10 to the lower edge of slag discharge hole 22 is 1.2 the distance from hearth 11 of melting pot 10 to the installation level of tuyeres 13. Oxygen-containing gas 3 (O$_2$=50%) is delivered at the rate of 1300 Nm$^3$/h per m$^2$ of the horizontal section area of the melt bath. Sponge iron is loaded at the rate of 40 t/h. The volumetric concentration of coal in the melt of bubbled zone 9 is 40%. Composition of the produced metal, weight %: coal=4.8; S=0.030; P=0.11; Si=0.15; Mn=0.16; Metal temperature at outlet, 1500° C.

The furnace output of liquid metal os 35.2 t/h, coal consumption, 26 t/h, extraction of iron into metal from iron-bearing material, 98.5%, dust carryover, 0.8%.

EXAMPLE 4

The melting process is similar to that disclosed in Example 3. Every 5 h the delivery of coal and sponge iron is interrupted for 25 min. The average sulphur content in the produced metal decreases to 0.015%.

EXAMPLE 5

The slag melt bath is built up in the furnace by pouring in liquid blast-furnace cast iron containing 4.8% C. at 1480° C. above the level of metal discharge channel 18 but lower than the upper boundary of slag discharge channel 17 followed by pouring in liquid blast furnace slag as in Example 1, above the level of nozzles 14 tuyenes 13. Then oxygen-containing gas 3 (O$_2$=80%) is delivered through tuyeres 13 at the rate of 1000 Nm$^3$/h·m$^2$, thus creating bubbled zone 9 of the melt. Then anthracite, lump size 0 to 15 mm, moisture content 5%, is delivered into bubbled zone 9 in an amount sufficient for the volumetric concentration of said anthracite to reach 25% in the melt, after which bubbled zone 9 is loaded, jointly with anthracite, with hematite ore, lump size 0 to 10 mm at the rate of 80 t/h. Chemical composition of ore, weight %: total iron 51.0; barren rock 23.5. The coke breeze is delivered in the amount of 1.4 t/h per m² of the horizontal section area of the melt. Lime consumption, 11 t/h.

Air is delivered at the rate of 5000 Nm³ per t of coke breeze above the melt surface through additional tuyeres 26 installed in furnace stack 12. The lower part 29 of furnace stack 12 has the shape of a trapezoid in a vertical cross section, the ratio of the horizontal section area of stack 12 at the installation level of additional tuyeres 26 to the horizontal section area of melting pot 10 at the installation level of tuyeres 13 being 2.0. Additional tuyeres 26 are installed in furnace stack 12 at the height equal to three times the distance from hearth 11 to the installation level of tuyeres 13. The process gases leaving upper bubbled zone 9 of the melt are reburned with the oxygen of oxygen-containing gas 3 fed in though additional tuyeres 26.

The heat released during this process is transferred by radiation and convection to the melt in upper bubbled zone 9.

The gases formed after reburning are discharged from furnace stack 12 through gas discharge means 15. The composition of dry gases, vol. %: $CO_2$. 32.0; $N_2$, the balance.

Slag 4 produced during melting is discharged from melting pot 10 as described in Example 2. Composition of the discharged slag weight %: $SiO_2$=39, MnO=1.4, $Fe_{tot}$=2.5, CaO=38.4, MgO=8.9, $Al_2O_3$=9.8. Slag temperature 1550° C.

Metal 5 is discharged from melting pot 10 continuously through channel 18, vat 23 and discharge hole 25.

Composition of discharged metal weight %: C=4.5; S=0.035; P=0.11; Si=0.08; Mn=0.09. Metal temperature, 1550° C. Furnace output is 40 t/h, consumption of anthracite, 28 t/h.

EXAMPLE 6

The slag melt is preliminarily built up by loading solid crushed blast-furnace slag and melting it. Then the furnace is loaded with sponge iron at the rate of 10 t/h of the following composition, mass %: total iron=98.0; metallic iron=97.0; barren rock=0.7. The delivery rate of coke breeze is 0.2 t/h per m² of the horizontal section area of the melt at the level of delivery into it of oxygen-containing gas 3. The volumetric content of coke breeze in bubbled zone 9 of the melt is 10%. The rate of delivery of oxygen-containing gas ($O_2$=99.5%) is 200 Nm³/h·m² below the melt surface level and 10 Nm³ per t of coke breeze above the melt surface.

Furnace capacity, liquid product, is 9.7 t/h, comsumption of coke breeze, 4th, iron extraction, 99.3%, dust carryover, 0.5%.

EXAMPLE 7

The process of melting is carried out along the lines specified in Example 5. Ore comsumption is 80 t/h. The solid carbon fuel is constituted by carbonaceous waste (product of refuse pyrolysis), carbon content 40%. The waste is loaded at the rate of 5 t/h per m² of the melt horizontal section area at the delivery level thereto of oxygen-containing gas 3.

Furnace capacity, liquid product, 40 t/h, consumption of carbonaceous waste, 100 t/h, extraction of iron from ore, 95%, dust carryover 0.5%.

EXAMPLE 8

The melting porcess is analogous to that described in Example 5. Oxygen-containing gas 3 is delivered concurrently with natural gas fed below the melt surface at the rate of 250 Nm³/h per m² of horizontal section area of the melt bath. The anthracite is loaded at the rate of 11.15 t/h per m² while ore and lime, at 88 t/h and 1.15 t/h, respectively. Furnace capacity, liquid product, is 44.2 t/h, anthracite consumption, 23 t/h, degree of iron extraction into the product, 98.5%.

INDUSTRIAL APPLICABILITY

As can be concluded from the quoted data, we propose a radically new method of preparing liquid ferrocarbon intermediate product for use in steelmaking, said method consisting in liquid-phase reduction. This process features essential advantages over the methods known heretore.

The process does not call for the use of metallurgical coke since it is substituted by coal or other kinds of carbon fuel or even by carbon-containing waste, The process does not call for the preparation of iron-ore raw material and can be used to advantage for processing various kinds of iron-bearing raw materials, including the kinds whose processing involves considerable difficulties, (e.g. slimes, dust released in gas purification plants, steel chips).

A version of the process involving reburning permits producing ferrocarbon product directly from the iron-ore raw material at a single stage combining high output with low fuel consumption. The specific output per unit of useful furnace volume in the process is 2 to 3 times that of the best known blast furnaces.

The process ensures a high degree of iron extraction from raw materials. Losses of iron with slag do not run higher than 2 to 4% depending on the process parameters.

The furnace is highly reliable and simple in design, it is easy to control, including the use of automation and electronic computers. Introduction of cooling elements in the zone of active slag and the presence of a calm layer of slag above the metal bath quarantees high stability of the refractory lining and long inter-repair intervals.

The method permits producing high-quality reducing gas for technological purposes.

Due to the possibility of changing their composition within broad limits, the produced slags can be utilized to various ends, for example for manufacturing construction materials.

The disclosed method enables the agglomerate and coking byproduct processes to be left out of the metallurgical cycle and reduces environmental pollution.

From the viewpoint of its utilization in steelmaking, the quality of the produced ferrocarbon product is not inferior to that of blast furnace cast iron.

The disclosed method can be used as a basis for small-scale manufacture of steel (miniplants).

Economical calculations have revealed that the expenditures incurred in steelmaking according to herein-proposed method and the furnaces for realization thereof can be 10 to 30% lower than those currently observed in the known technologies.

We claim:

1. A method for preparng a ferrocarbon intermediate product which comprises:

(a) forming a slag melt in a slag melt zone (b) introducing an oxygen containing gas below the surface of the slag melt at a level to form an upper bubbling slag melt zone and a lower quiescent slag melt zone;

(c) introducing a solid, carbon containing fuel and an iron containing material into the slag melt in an amount sufficient to maintain a volumetric concentration of solid carbon containing fuel in the bubbling slag melt zone of from 0.5 to 50%, whereby additional slag and a liquid ferrocarbon intermediate product are formed, the liquid ferrocarbon intermediate product passing through the quiescent slag melt zone to form a layer in a ferrocarbon intermediate product zone; and (d) recovering separately the slag melt from the quiescent slag melt zone and the ferrocarbons intermediate product from the ferrocarbon intermediate product zone.

2. A method according to claim 1 wherein the slag melt zone has a horizontal section area, and the oxygen-containing gas (3) is introduced into the slag melt at a rate of 150 to 1500 Nm$^3$/h per m$^2$ of the horizontal section area of the slag melt zone at the level of delivery of the oxygen-containing gas (3).

3. A method according to claim 2, wherein the consumption of oxygen-containing gas (3) delivered into the slag melt is increased with an increase in the reactivity of solid carbon fuel (2).

4. A method according to claim 1 wherein the oxygen-containing gas (3) is continuously introduced into the slag melt in the process of melting, periodically interrupting the concurrent loading of the iron-containing material (1) and solid carbon fuel (2).

5. A method according to claim 1 wherein the slag melt is initially formed by pouring liquid slag into the slag melt zone, the liquid slag produced in the manufacture of ferrous metals.

6. A method according to claim 5 wherein the pouring-in of liquid slag is preceded by pouring liquid metal into the ferrocarbon intermediate product zone.

7. A method according to claim 1 wherein the slag melt is build up by loading and melting at least one of a solid oxide material selected from the group consisting of slag produced in the manufacture of ferrous metals, crude minerals, and metal oxides.

8. A method according to claim 1 wherein a gaseous, liquid or solid pulverized carbonaceous fuel is introduced into the bubbling slag melt zone.

9. A method according to claim 1 wherein the slag (4) is discharged from the lower quiescent slag melt zone (8) of the slag melt at the level of the middle or upper part of the zone.

10. A method according to claim 1 wherein the oxygen-containing gas (3) is additionally delivered above the surface of the slag melt, at the rate of $0.01 \times 10^3$ to $5.0 \times 10^3$ Nm$^3$ per ton of solid carbon fuel.

11. A method according to claim 10 wherein in the concurrent introduction of the iron-containing material (1) and solid carbon fuel (2) the solid carbon fuel is introduced at a rate of 0.2 to 5.0 t/h per m$^2$ of the horizontal section area of the slag melt at the level delivery thereto of oxygen-containing gas (3).

12. A furnace for the production of a ferrocarbon intermediate product comprising: a melting pot (10) having walls, with a hearth (11), a stack (12) having walls resting on said melting pot (10) and provided with at least one means (16) for charging the iron-containing material and solid carbon fuel into the melting pot (10), the means being arranged in the upper part of the stack (12), tuyers (13) with nozzles (14) for the delivery of oxygen-containing gas into the melting pot (10), having a slag discharge channel (17) having an upper boundary, arranged in the wall of the melting pot (10) above the hearth (11), a ferrocarbon intermediate product discharge channel (18) having a lower boundary arranged in the wall of the melting pot (10) below an installation level of tuyers (13) with nozzles (14), a means (15) for the discharge of process gases arranged in an in upper part of the stacl (12), wherein, the melting pot (10) and stack (12) are of an essentially rectangular shape in a horizontal section, each having a longer wall and a shorter wall, the tuyers (13) with nozzles (14) are arranged in the longer walls of the melting pot (10), the channels (17) and (18) are arranged in the shorter walls of the melting pot (10), the ratio, of the horizontal section area of the melting pot (10), at the installation level therein of tuyers (13) with nozzles (14), to a total area of the outlet holes of nozzles (14) is 300 to 10000 and the distance (h) from the lower boundary of the slag discharge channel (17) being 0.3 to 0.75 the distance (H) from the lower boundary or product discharge channel (18) to the installation level of tuyers (13) with nozzles (14) in the melting pot (10).

13. A furnace according to claim 12, wherein, a wall portion of the upper part of the melting pot (10) and at least a wall portion of the lower part of the stack (12) are provided with cooling means to form a cooled portion.

14. A furnace according to claim 13, wherein, the tuyers (13) with nozzles (14) for the delivery of oxygen-containing gas into the melting pot are installed in the cooled portion.

15. A furnace according to claim 12 additionally comprising a slag precipitation vat (20) with a slag discharge hole (22) for discharge of the slag melt, communicating with melting pot (10) through a slag discharge channel (17), an average area of the slag precipitation vat (20) being 0.03 to 0.3 an average area of the horizontal section of the melting pot (10).

16. A furnace according to claim 15, wherein, a vertical distance ($H_1$) from the hearth (11) of the melting pot (10) to a lower edge of the slag discharge hole (22) of the slag precipitation vat (20) is from 1.1 to 2.5 the distance ($H_2$) from the hearth (11) of the melting pot (10) to the installation level therein of tuyers (13) with nozzles (14).

17. A furnace according to claim 12, further comprising a ferrocarbon intermediate product intermediate product precipitation vat 23 with a ferrocarbon intermediate product discharge hole (25) arranged at a level above the hearth in communication with the melting pot (10) through a product discharge channel (18) to provide a constant level of the product in the melting pot (10) in the course of melting during continuous discharge of the ferrocarbon intermediate product from the furnace.

18. A furnace according to claim 12 additionally comprises, additional tuyers (26) with nozzles (27) arranged for the delivery of oxygen-containing gas into the stack at a level above the slag melt.

19. A furnace according to claim 18 wherein the distance $NH_3$) from the hearth (11) of the melting pot (10) to the installation level of additional tuyers (26) of any row is 0.5 to 6.0 the distance ($H_2$) from the hearth (11) of the melting pot (10) to the installation level therein of the tuyers (13).

20. A furnace according to claim 18 wherein a horizontal section area of the stack (12) at the installation level of the additional tuyers (26) of any row is 1.05 to 2.0 the horizontal section area of the melting pot (10) at the installation level therein of the main tuyers (13).

21. A furnace according to claim 18 wherein, at least a lower part (29) of the stack (12) has the shape of the trapezoid in a vertical section, a smaller base of the trapezoid resting on the melting pot (10).

* * * * *